United States Patent
Jang et al.

(10) Patent No.: US 7,515,830 B2
(45) Date of Patent: Apr. 7, 2009

(54) OPTICAL COMMUNICATION APPARATUS BY USING SUBCARRIER MULTIPLE ACCESS AND METHOD THEREOF

(75) Inventors: Seung-Hyun Jang, Jeju-Do (KR);
Eui-Suk Jung, Daejon (KR);
Byoung-Whi Kim, Gyeonggi-Do (KR);
Hyeong-Ho Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 606 days.

(21) Appl. No.: 10/830,763

(22) Filed: Apr. 22, 2004

(65) Prior Publication Data

US 2005/0069332 A1 Mar. 31, 2005

(30) Foreign Application Priority Data

Sep. 26, 2003 (KR) ................. 10-2003-0066843

(51) Int. Cl.
*H04J 14/00* (2006.01)
*H04J 14/02* (2006.01)
*H04B 10/04* (2006.01)

(52) U.S. Cl. .................... 398/95; 398/196; 398/76; 398/71

(58) Field of Classification Search ................ 398/141, 398/163, 167.5, 168, 79, 196, 59, 83; 385/9, 385/14–15, 37; 359/124–127
See application file for complete search history.

(56) References Cited

U.S. PATENT DOCUMENTS 5,373,385 A * 12/1994 Darcie et al. ............ 398/187

| | | | |
|---|---|---|---|
| 5,401,956 A * | 3/1995 | Dunphy et al. | 250/227.18 |
| 5,798,858 A | 8/1998 | Bodeep et al. | |
| 6,137,607 A | 10/2000 | Feldman et al. | |
| 6,417,942 B1 * | 7/2002 | Seto et al. | 398/5 |
| 6,868,200 B2 * | 3/2005 | Kimotsuki et al. | 385/24 |
| 2002/0048065 A1 * | 4/2002 | Shani | 359/127 |
| 2002/0180957 A1 * | 12/2002 | Lauder et al. | 356/124 |
| 2002/0191904 A1 * | 12/2002 | Kani et al. | 385/24 |
| 2003/0108072 A1 * | 6/2003 | Hedin | 372/32 |
| 2004/0013437 A1 * | 1/2004 | Wiltsey et al. | 398/183 |
| 2004/0190570 A1 * | 9/2004 | Hubner | 372/32 |
| 2004/0208566 A1 * | 10/2004 | Yu | 398/79 |

FOREIGN PATENT DOCUMENTS

JP 06-177840 6/1994

OTHER PUBLICATIONS

Journal of LIghtwave Technology, vol. 17, No. 9, Sep. 1999, pp. 1525-1531.

* cited by examiner

*Primary Examiner*—Dalzid Singh
(74) *Attorney, Agent, or Firm*—Blakely, Sokoloff, Taylor & Zafman LLP

(57) ABSTRACT

An optical communication apparatus using a sub-carrier multiple access includes a laser diode for generating an optical signal with a central frequency, a temperature controller installed at a subscriber side for controlling a temperature of laser diode placed at a transmitting terminal, an optical coupler for coupling the optical signal outputted from the laser diode to an optical fiber and an optical receiver for receiving the optical signal outputted from the optical coupler. The central frequency of the optical signal outputted from the laser diode is changed in response to the change of the temperature controlled by the temperature controller.

8 Claims, 6 Drawing Sheets

OPTICAL COMMUNICATION APPARATUS BY USING SUBCARRIER MULTIPLE ACCESS AND METHOD THEREOF

FIELD OF THE INVENTION

The present invention relates to an optical communication system; and, more particularly, to an optical communication apparatus using sub-carrier multiple access and a method thereof which reduces an optical beat interference generated when the sub-carrier multiple access is employed.

DESCRIPTION OF RELATED ART

Recently, an optical subscriber network remarkably being paid attention to a next generation subscriber network has an excellent security as well as supplies a large capacity of information to the subscribers. Although the optical subscriber network has the above-described advantages, if the optical subscriber network employs a point-to-point type communication, it has not been putted to a practical use due to the heavy construction cost.

One of methods for implementing an economical optical subscriber network is a method to reduce the construction cost for each subscriber by constructing a network of the point-to-multipoints type, which owns one optical fiber in common as an optical receiving terminal by several subscribers.

To implement the point-to-multipoint networks, some multiple access technologies are needed. In a sub-carrier multiple access type, a transmitter transmits a sub-carrier signal allocated to each of the subscribers commonly owning the optical fiber. A different sub-carrier signal is assigned to each of the light sources of the subscribers, and the information is carried on the sub-carrier. The information is classified at the receiver by filtering the signal by using a band pass filter corresponding to the subscriber.

FIGS. 1A and 1B are exemplary diagrams showing a conventional point-to-point and a point-to-multipoints optical network.

At first, FIG. 1A is a schematic construction diagram of the point-to-point type optical subscriber network.

Referring to FIG. 1A, N number of subscribers 101-, an optical transmitter 102 for transmitting optical signals inside of the optical subscribers 101, an optical fiber 103 for transmitting the optical signals and an optical receiver 104 for receiving each of the optical signals transmitted through the optical fiber 103 as a different input, respectively.

FIG. 1B represents a system commonly owning one optical fiber by several subscribers with utilizing sub-carrier multiple access method to the point-to-point optical subscriber network as shown in FIG. 1A.

Referring to FIG. 1B, N number of subscribers 111, an optical transmitter 112 for transmitting optical signals inside of the optical subscribers 111, a first optical fiber 113 for transmitting the optical signals, an optical coupler 114 for coupling the N number of optical signal to only one optical fiber, a second optical fiber 115 for transmitting the optical signal generated from the optical coupler 114 and an optical receiver 116 for receiving the optical signals transmitted through the second optical fiber 115 as one input.

The subscribers from "1" to "N" 111 transmit sub-carriers different from each other with carrying information. If the subscribers commonly own the optical fiber by using the sub-carrier multiple access method to the subscriber network having "N" number of subscriber as shown in FIG. 1A, it becomes to the network shown in FIG. 1B, therefore, reduces the cost for each of the subscribers since the second optical fiber 115 has only one optical fiber 115, thereby constructing a cheap optical subscriber network.

However, in case when the optical subscriber network utilizes the sub-carrier multiple access method, the optical interference noise is generated when at least two light beams from two light sources are received at the receiver, therefore, there has a problem that the signal to noise ratio are reduced when the optical interference noise exists in the sub-carrier signal bandwidth.

The optical interference noise is described hereinafter in detail.

The optical interference noise is generated when at least two light beams from a plurality of light sources are received at only one optical receiver, the central frequency located at a position corresponding to a frequency difference between two light sources and the shape of the spectrum comes out as the convolution of spectrum from two light sources. Therefore, in the sub-carrier multiple access case when various laser beams are received at only one optical receiver, the optical interference noise is occurred. If the central frequency difference between two light sources is located inside of the sub-carrier multiple access, the optical interference noise is occurred inside of the sub-carrier signal band width, thereby acting as a noise to lowering the signal to noise ratio. Since, it is very important to reduce the optical interference noise at the optical subscriber network employing the sub-carrier multiple access method.

One of the conventional optical interference noise reduction methods utilizes a light source having an optical spectrum becoming wider than that of the light source by using an external device or being wide. This method utilizes the characteristics that, since the optical interference noise comes out as the convolution of spectrum from two light sources, by making wider the spectrum of the light source, the noise appears low in the given sub-carrier signal frequency bandwidth by generating the optical interference noise in the form of its convolution wider.

However, the above-described optical interference reduction method has problems as follows.

A method for lowering the optical interference noise by widening the spectrum of the light source has a problem that a number of subscribers do not accommodated thereto. Since as the number of subscribes are increased the optical interference noises generated from the number of light sources, in this result, the signal to noise ratio becomes worse, thereby not obtaining a desired signal to noise ratio.

SUMMARY OF THE INVENTION

It is, therefore, an object of the present invention to provide an optical communication apparatus using sub-carrier multiple access and a method thereof capable of increasing the signal to noise ratio by creating the optical interference noise of the receiver at the outside of the sub-carrier signal bandwidth.

The optical interference noise, which is a noise created when at least two light beams are received at one receiver, is obtained by using characteristics that the optical interference noise is generated at a frequency bandwidth corresponding to the central frequency difference of two light sources. By using a temperature control device, a distance between the central frequencies of light sources is to be apart more than the frequency bandwidth having the sub-carrier signal.

In accordance with one aspect of the present invention, there is provided an optical communication apparatus by using a sub-carrier multiple access, which includes: a laser diode for generating an optical signal with a central frequency; a temperature control unit installed at a subscriber side for controlling a temperature of laser diode placed at a transmitting terminal; an optical coupling unit for coupling the optical signal outputted from the laser diode to an optical fiber; and an optical receiving unit for receiving the optical signal outputted from the optical combining unit, wherein the central frequency of the optical signal outputted from the laser diode is changed in response to the change of the temperature controlled by the temperature control unit.

In accordance with another aspect of the present invention, there is provided an optically communicating method using a sub-carrier multiple access, which includes the steps of: a) changing a central frequency of an optical signal emitted from a laser diode by using a temperature controller connected to a subscriber; b) modulating the optical signal with the changed central frequency into a sub-carrier signal assigned to the subscriber by using a laser driver of the laser diode; c) combining the optical signals of the subscriber by using an optical coupler to generate a combined optical signal; and d) transferring the combined optical signal to an optical receiver.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, a preferred embodiment of the present invention will be described in detail referring to the accompanying drawings.

Figure 1A:
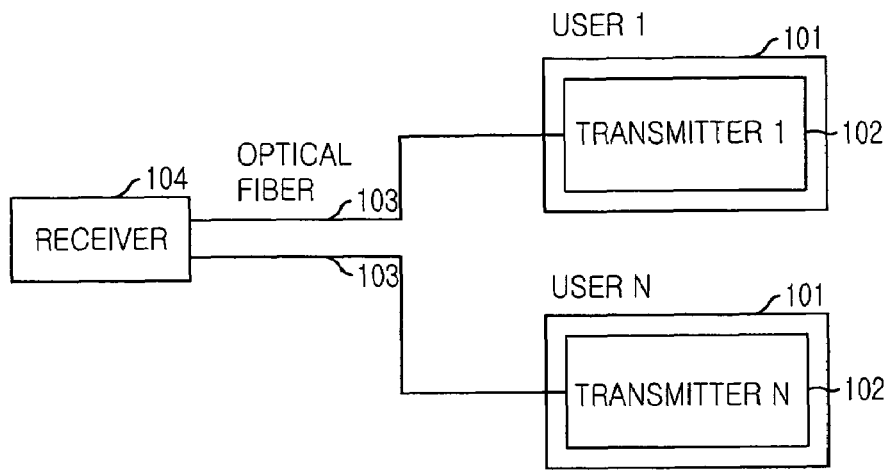
FIGS. 1A and 1B are exemplary diagrams showing a conventional point to point and a point to multi-points optical network.
Figure 1B:
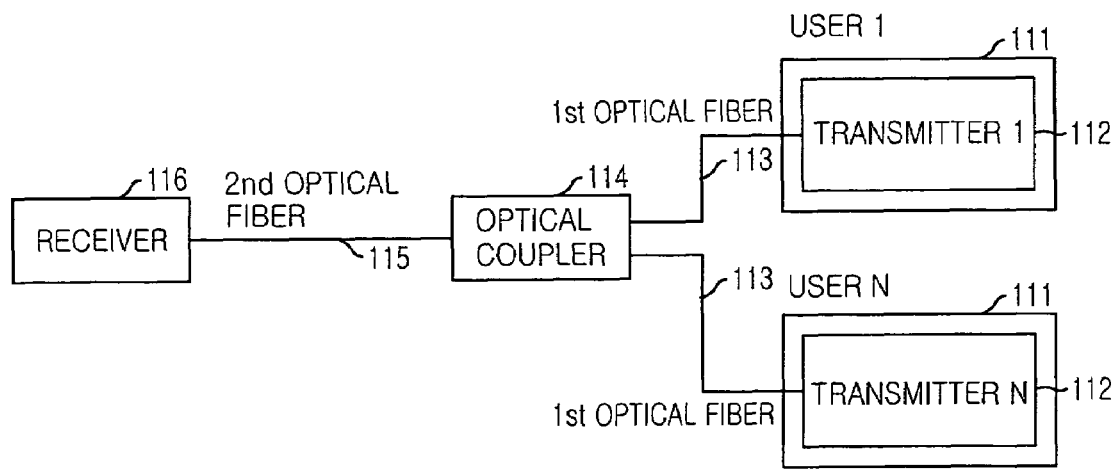
Figure 2:
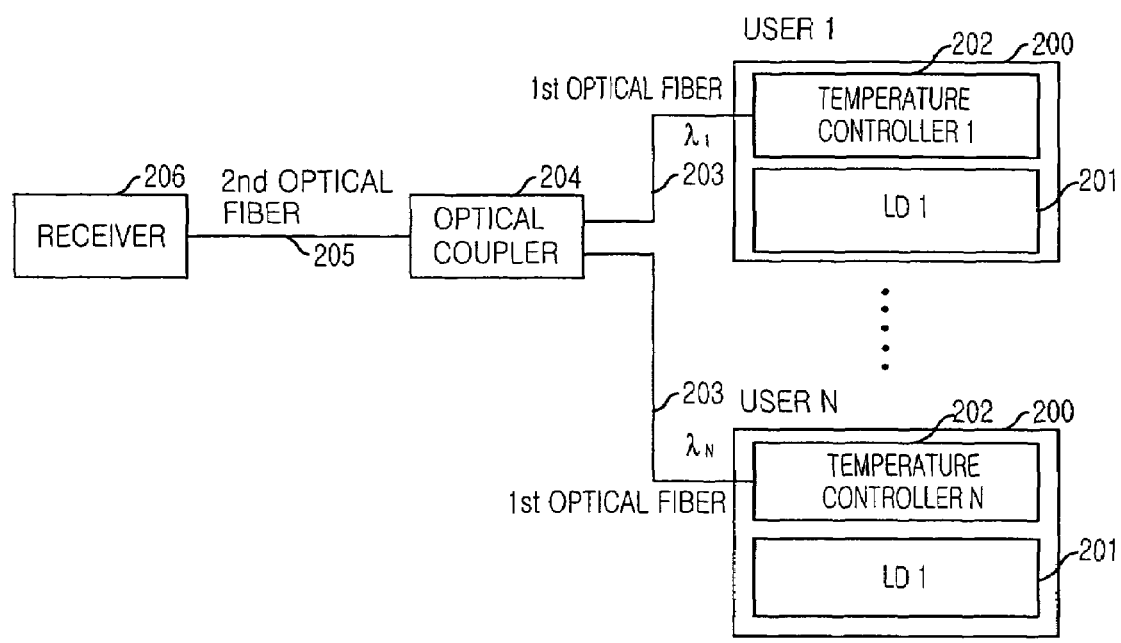
FIG. 2 shows an optical communication apparatus by using sub-carrier multiple access in accordance with a preferred embodiment of the present invention.

FIG. 2 shows an optical communication apparatus by using sub-carrier multiple access in accordance with a preferred embodiment of the present invention.

As shown in FIG. 2, an optical communication apparatus by using sub-carrier multiple access in accordance with a preferred embodiment of the present invention includes a laser diode 201 for generating an optical signal with a central frequency, a temperature controller 202 installed at a subscriber 200 side for controlling a temperature of the laser diode 201 placed at a transmitting terminal, a first optical fiber 203 for guiding the optical signal, an optical coupler 204 for coupling the optical signal passing through the first optical fiber 203 into one optical fiber, a second optical fiber 205 for passing through the optical signal outputted from the optical coupler 204 and an optical receiver 206 for receiving the optical signal outputted from the second optical fiber 205, wherein the central frequency of the optical signal outputted from the laser diode 201 is changed in response to the change of the temperature controlled by the temperature controller 202.

Reviewing the functions of each element described above, the laser diode 201 of the subscriber 200 connected to the optical coupler 204 changes its central frequency from $\lambda_1$ to $\lambda_N$ by using the temperature controller 202.

The wavelength from $\lambda_1$ to $\lambda_N$ makes the central frequency difference between two arbitrary wavelengths to be larger than the sub-carrier signal bandwidth.

The laser diode 201 modulates the signal into the sub-carrier signal assigned to the subscriber 200 by using a laser driver. The modulated optical signals of each subscriber are coupled to the optical coupler 204 after passing through the first optical fiber 203.

The optical signal coupled by the optical coupler 204 passes through the second optical fiber 205, and then the optical signals of $\lambda_1$ to $\lambda_N$ are received at the optical receiver 206.

Figure 6:
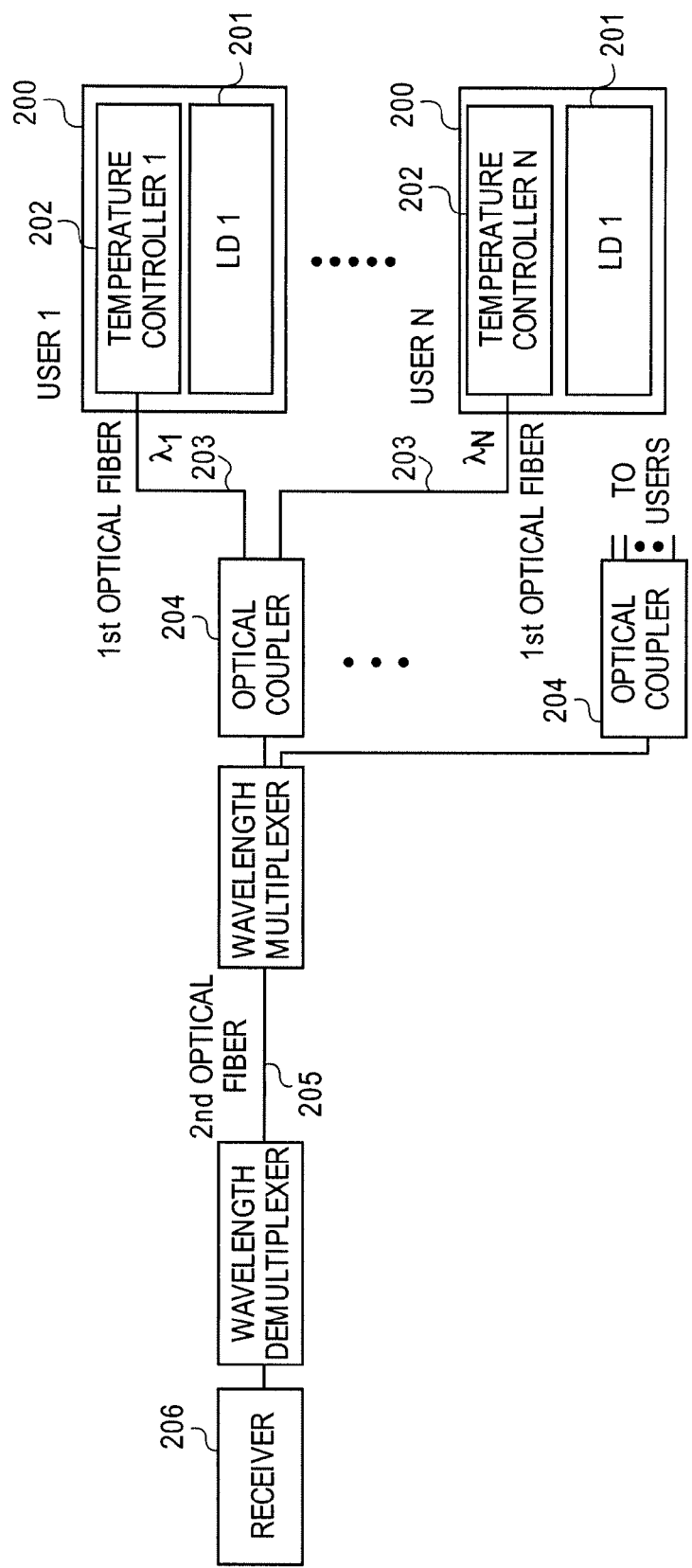
FIG. 6 shows an embodiment of an optical communication apparatus including a wavelength multiplexer and a wavelength demultiplexer.

On the other hand, referring to FIG. 6, an optical communication apparatus by using sub-carrier multiple access in accordance with a preferred embodiment of the present invention further includes a wavelength multiplexer for multiplexing the optical signal outputted from the optical coupler 204 with an optical signal outputted from another optical coupler used for another wavelength bandwidth and a wavelength demultiplexer for demultiplexing the wavelength multiplexed optical signal at the wavelength multiplexing means. Here, the wavelength multiplexer and the wavelength demultiplexer can employ an arrayed-waveguide grating and a wavelength add drop multiplexer, and also, the wavelength couple/division multiplexer can construct an optical communication network in the form of a ring network by configuring with a predetermined number.

Figure 3A:
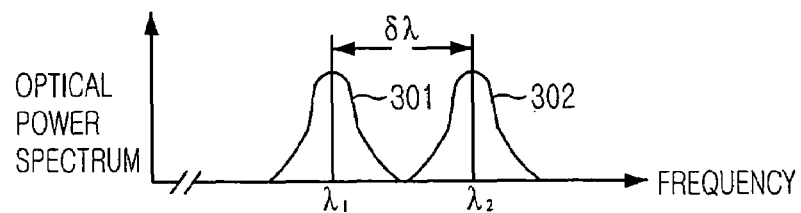
FIGS. 3A to 3C illustrate diagrams optical noises of the optical communication apparatus in accordance with the preferred embodiment of the present invention.
Figure 3B:
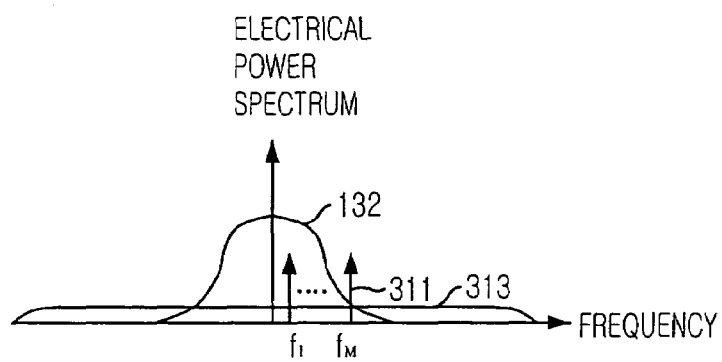
Figure 3C:
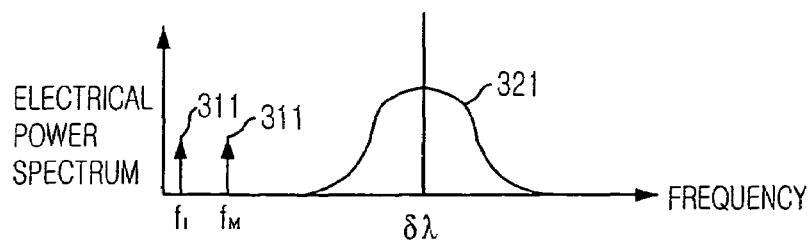

FIGS. 3A to 3C illustrate diagrams optical noises of the optical communication apparatus in accordance with the preferred embodiment of the present invention, when two light beams are received at the optical receiver, there are shown the optical interference noises generated when the central frequency difference is farther apart from than the sub-carrier bandwidth with controlling the light source of the subscriber by the temperature controller and otherwise.

FIG. 3A shows a diagram showing an optical spectrum just before the optical receiver 206 when two light beams are received at one optical receiver 206, simultaneously.

The central frequency of a subscriber 1 light source 301 is $\lambda_1$ and the central frequency of a subscriber 2 light source 302 is $\lambda_2$, and the spectrum of two light sources being apart from each other in the difference $\delta\lambda$ between two central frequencies.

FIG. 3B illustrates an electrical spectrum when the light beams having the same optical spectrum shown in FIG. 3A are receives at one optical receiver 206 and the electrical spectrum at the receiver when the central frequency difference between two light beams nearly equal to each other and the light beams having more wide optical spectrum than the optical spectrum shown in FIG. 3A are received at the optical receiver 206.

If the difference $\delta\lambda$ between two central frequencies becomes nearly to 0, that is, if the central frequencies of two light beams are nearly equal to each other, the optical interference noise is generated adjacent to the electrical spectrum of the optical receiver 206 where the frequency is 0. It is the principle that the optical interference noise is formed at a frequency corresponding to the central frequency difference of the light beams. At this time, if the spectrum of the light beams is narrow as the optical spectrum of FIG. 3A, it becomes a large noise source at the sub-carrier bandwidth by largely creating at a narrow frequency bandwidth around a point where the frequency is 0. However, if the spectrum of the light source is wide, the optical interference noise also widely distributes for the frequency, and the signal to noise ratio is relatively increased in comparison with when the spectrum of the light source is narrow by being created 313 lower in the sub-carrier bandwidth. Therefore, a conventional method for reducing the optical interference noise has been widely used the above-described method.

However, as the number of the optical subscriber 200 commonly owning the wavelength becomes larger, the optical interference noise in the sub-carrier bandwidth get accumulated continuously, thereby limiting the number of subscriber 200 to satisfy the required quality.

FIG. 3C represents an electrical spectrum when the light beams having the same optical spectrum shown in FIG. 3A are receives at one optical receiver 206 and the electrical spectrum at the receiver 206 when the central frequencies of two light beams are transmitted with being apart farther than the sub-carrier signal bandwidth.

The temperature of the laser diode 201 can be changed by using the temperature controller 202 placed at the transmitter of the side of the subscriber 200 and the changed temperature also can vary the central frequency. Therefore, as can be seen from FIG. 3C, the optical interference noise 321 at the optical receiver 206 generates a frequency being higher than the sub-carrier bandwidth and the signal to noise ratio becomes to increase in comparison with the case shown in FIG. 3B. Therefore, a number of subscribers 200 can own in common by one wavelength with satisfying a high quality of communication service.

Figure 4:
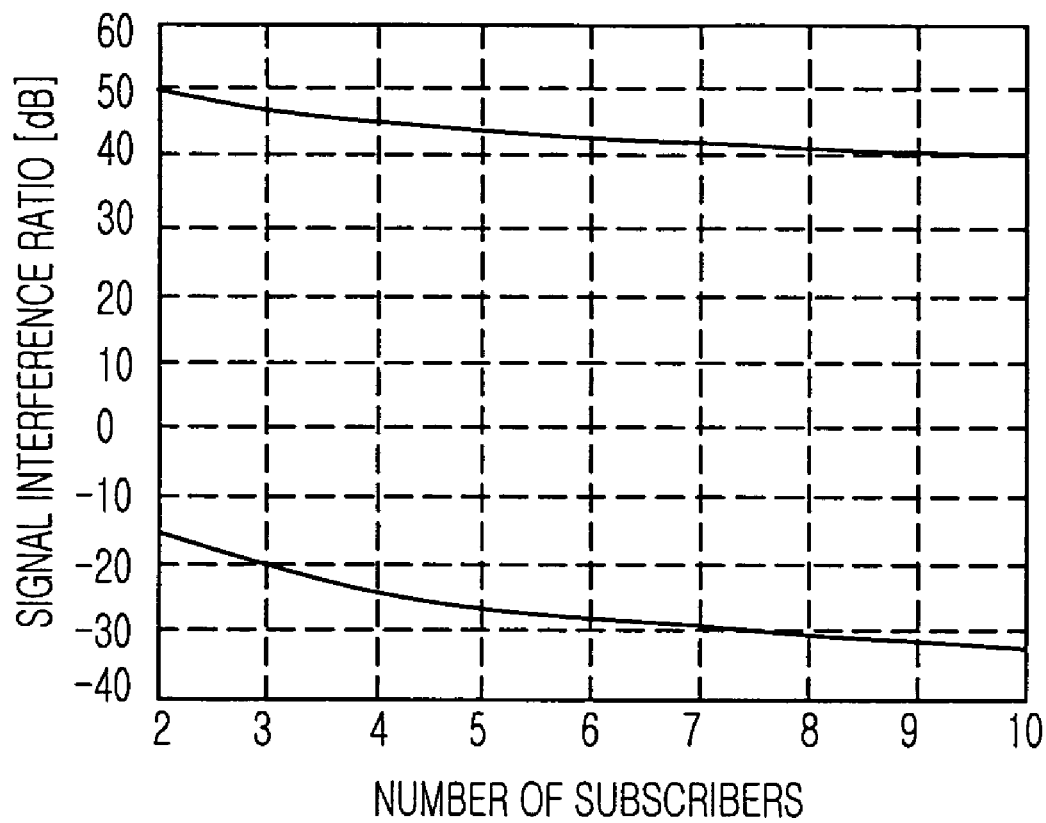
FIG. 4 is a graph presenting a signal to noise ratio of the optical communication apparatus in accordance with the preferred embodiment of the present invention.

FIG. 4 is a graph presenting a signal to noise ratio of the optical communication apparatus in accordance with the preferred embodiment of the present invention, and shows the simulation results comparing the case utilizing the optical interference noise reducing apparatus in accordance with the preferred embodiment of the present invention with the other case which does not utilize the optical interference noise reducing apparatus of the present invention.

The equations used in the simulation, which described at a paper entitled "CAN DESEM, Optical Interference in Sub-carrier Multiplexed Systems with Multiple Optical Carriers," *IEEE Journal on Selected Areas in Communications*, Vol. 8. NO. 7, September 1990, as follows:

$$SIR = 10 \log \left[ \frac{\frac{1}{2} <m_i(t)^2>}{F(\delta f)B} \right] \text{ with } F(\delta f) = \frac{8}{\pi \Delta f}\left[1+\left(\frac{2\delta f}{\Delta f}\right)^2\right]^{-1} \quad \text{Eq. (1)}$$

wherein, since a signal to interference ratio (SIR) is that the light beams beat with the noise, finally means a signal to noise ratio (SNR). And also, $m_i$ means the modulation index of the $i^{th}$ sub-carrier signal and $$\frac{1}{2} <m_i(t)^2>$$

means the average message power of the $i^{th}$ sub-carrier signal.

On the other hand, if the noise bandwidth B is multiplied with a power spectrum of the interference noise $F(\delta\lambda)$, the result becomes the noise power in the noise bandwidth. And, if the light beam from the light source has Lorentzian line shape, the optical interference noise also represents as $F(\delta\lambda)$.

Also, $\delta\lambda$ means the difference between the central frequencies generated from two light sources beating each other, $\Delta\lambda$ means 3-decibel line width (FWHM; full width half maximum) of the optical interference noise.

$$SIR_N = SIR|_\delta - 10 \log(N-1) \quad \text{Eq. (2)}$$

wherein, the equation 1 merely represents the SIR(=SNR) due to the beating of the two light beams from the light sources, whereas the equation 2 the SIR in case when the number of beating light beams is larger than 2. More particularly, it is adaptable for separating the proposed central wavelength more apart.

And also, $SIR_N$ represents the case when N number of light beams from N number of light sources are beated and its unit is decibel (dB). $SIR_{(N=2)}$ represents the SIR due to an optical interference noise generated by two light beams from two light sources and its unit also decibel. At this time, N represents the number of light beams beating each other.

Since the line width of a distributed feedback laser diode (DFB LD) is ranged from several MHz to several tens of MHz, here taking 10 MHz as a reference. The line width of the optical interference noise between two light sources having such line widths, taking 20 MHz since it equals to the sum of two line widths from the light sources. The simulation is performed by taking the modulation index as "0.8", the band width as 100 MHz and the central frequency difference of two light beams emitted from the two light sources as 20 GHz.

The signal to noise ratio 401 in accordance with the preferred embodiment of the present invention is much higher than that of the conventional case 402, and there is a gain in the order of about 70 Db when the above-described numerical values are inserted.

Although the simulation in accordance with the preferred embodiment of the present is implemented for the specific numerical values, it can be performed by using a laser having another spectrum shape or a light source having another line width, another modulation index and other band width of the optical receiver 240.

Figure 5:
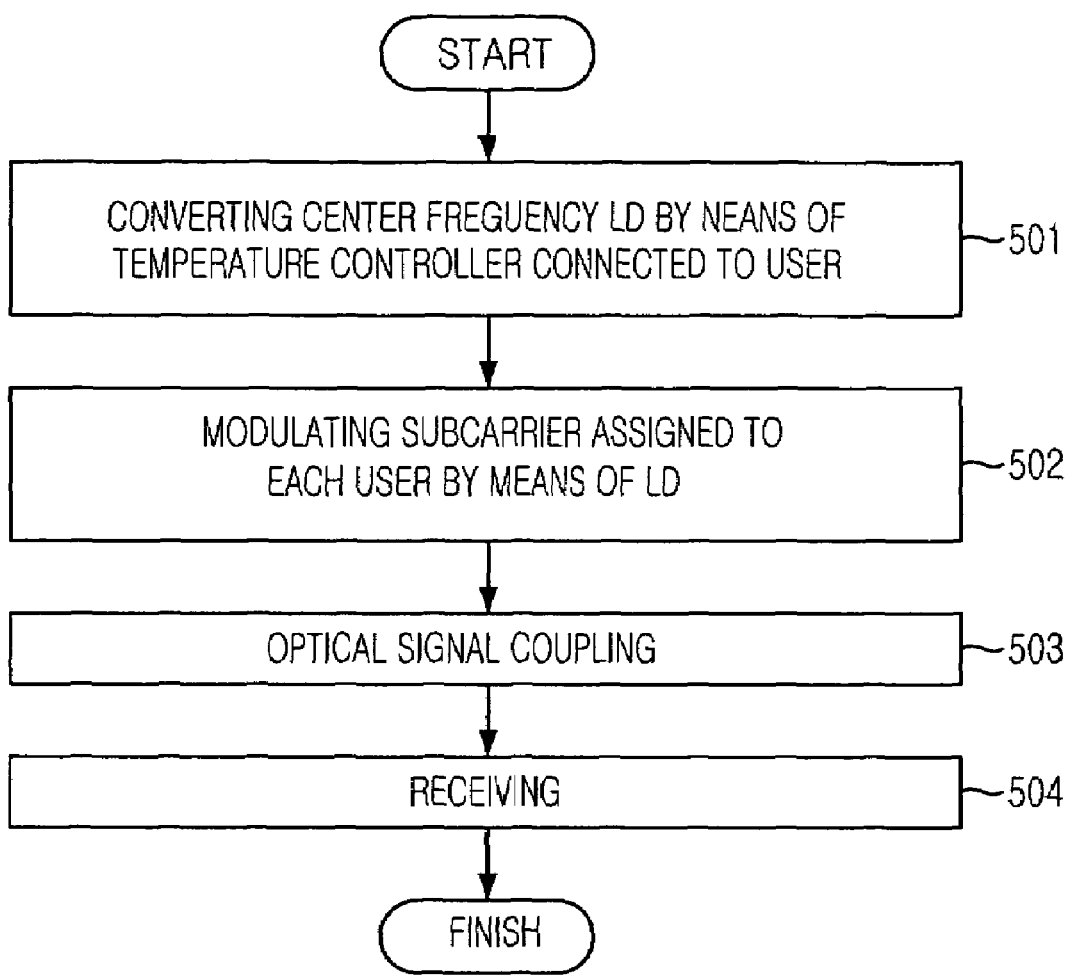
FIG. 5 is a flow chart showing an optical communication method by using sub-carrier multiple access in accordance with another preferred embodiment of the present invention.

FIG. 5 is a flow chart showing an optical communication method by using sub-carrier multiple access in accordance with another preferred embodiment of the present invention.

As shown in FIG. 5, at first, an optical communication method by using sub-carrier multiple access in accordance with another preferred embodiment of the present invention changes the central frequency of the laser diode by using a temperature controller coupled to a subscriber connected to the optical coupler at step 501. Here, the frequency makes a central frequency difference between two arbitrary wavelengths to be larger than the sub-carrier signal bandwidth.

In the next step 502, the laser diode modulates its central frequency into a sub-carrier signal assigned the subscriber by using a laser driver.

Subsequently, the optical communication method by using sub-carrier multiple access in accordance with another preferred embodiment of the present invention performs the steps of: coupling 503 after passing through the optical coupler; after performing the couplings step 503, wavelength modulating the coupled optical signal; and demultiplexing the wavelength multiplexed signal.

In accordance with another preferred embodiment of the present invention described above, there is an effect that a low cost optical subscriber network can be constructed by reducing the cost of the receiving terminal with using a low cost light source only packaged with a laser diode together with an external temperature controller without using a high cost light source packaged together with the temperature control module and the laser diode.

And also, in accordance with another preferred embodiment of the present invention, since the optical interference noise is generated at outside of the signal bandwidth, there is an advantage that the number of optical subscribers owning the wavelength in common by effectively improving the signal to noise ratio in comparison with a conventional method for reducing the optical interference noise in the signal bandwidth.

While the present invention has been described with respect to the particular embodiments, it will be apparent to those skilled in the art that various changes and modifications may be made without departing from the spirit and scope of the invention as defined in the following claims.

What is claimed is:

1. An optical communication apparatus using a sub-carrier multiple access, comprising:
    a plurality of subscribers, each subscriber comprising a laser diode for generating an optical signal with a central frequency
    and a temperature control means for controlling a temperature of the laser diode placed at a transmitting terminal;
    an optical coupling means for combining the optical signal outputted from the laser diode with other optical signals, and outputting a combined optical signal to an optical fiber;
    an optical receiving means for receiving the combined optical signal outputted from the optical coupling means;
    a wavelength multiplexing means for multiplexing the optical signal outputted from the optical coupling means with an optical signal outputted from another optical coupling means used for another wavelength bandwidth, the wavelength multiplexing means to form part of a ring network; and
    a wavelength demultiplexing means for demultiplexing the wavelength multiplexed optical signal outputted from the wavelength multiplexing means,
    wherein the central frequency of the optical signal outputted from the laser diode is changed in response to the change of the temperature controlled by the temperature control means, such that a central frequency difference between the optical signal and any of the other optical signals is larger than a bandwidth of a sub-carrier signal assigned to the subscriber.

2. The optical communication apparatus as recited in claim 1, wherein the temperature control means reduces an optical interference noise by adjusting the central frequency of the optical signal outputted from the laser diode.

3. The optical communication apparatus as recited in claim 1, wherein the wavelength multiplexing means includes an arrayed-waveguide grating and a wavelength add drop multiplexer.

4. The optical communication apparatus as recited in claim 1, wherein the wavelength demultiplexing means includes an arrayed-waveguide grating and a wavelength add drop multiplexer.

5. The optical communication apparatus as recited in claim 1, wherein the temperature control means reduces an optical interference noise by adjusting the central frequency of the optical signal outputted from the laser diode.

6. The optical communication apparatus as recited in claim 5, wherein the wavelength multiplexing means includes an arrayed-waveguide grating and a wavelength add drop multiplexer.

7. The optical communication apparatus as recited in claim 5, wherein the wavelength demultiplexing means includes an arrayed-waveguide grating and a wavelength add drop multiplexer.

8. An optically communicating method using a sub-carrier multiple access, comprising the steps of:
    a) changing a central frequency of an optical signal emitted from a laser diode by using a plurality of temperature controllers respectively connected to a plurality of subscribers, the central frequency being changed such that a central frequency difference between the optical signal and any of other optical signals of the subscriber is larger than a bandwidth of a sub-carrier signal assigned to the subscriber, and wherein a plurality of laser diodes are respectively connected to the plurality of subscribers;
    b) modulating the optical signal with the changed central frequency into the sub-carrier signal assigned to the subscriber by using a laser driver of the laser diode;
    c) combining the optical signal and the other optical signals of the subscriber by using an optical coupler to generate a combined optical signal;
    d) transferring the combined optical signal to an optical receiver;
    e) wavelength multiplexing the combined optical signal by a wavelength multiplexer that forms part of a ring network, to thereby generate a wavelength multiplexed optical signal; and
    f) wavelength demultiplexing the wavelength multiplexed optical signal to generate the combined optical signal and transmitting the combined optical signal.

* * * * *